United States Patent [19]

Lundquist et al.

[11] Patent Number: 4,817,001
[45] Date of Patent: Mar. 28, 1989

[54] METHOD OF CORRECTING NAVIGATION SYSTEM ERRORS CAUSED BY DRIFT

[75] Inventors: Alan E. Lundquist, Salt Lake City; Billie M. Spencer, Bountiful; John W. Zscheile, Jr., Farmington, all of Utah

[73] Assignee: Unisys Corporation, Blue Bell, Pa.

[21] Appl. No.: 39,339

[22] Filed: Apr. 17, 1987

[51] Int. Cl.$^4$ .............................................. G01S 3/02
[52] U.S. Cl. .................................. 364/460; 364/459; 342/352
[58] Field of Search ............... 364/443, 457, 459, 460, 364/454, 455; 342/118, 125, 126, 133, 105, 451, 458, 62, 74, 75, 352, 355

[56] References Cited

U.S. PATENT DOCUMENTS

| | | | |
|---|---|---|---|
| 3,243,812 | 3/1966 | Williams | 342/126 |
| 3,310,982 | 3/1967 | Yamrom | 364/459 |
| 3,940,597 | 2/1976 | Di Matteo | 364/454 |
| 4,315,260 | 2/1982 | Küpfer | 342/125 |
| 4,357,609 | 2/1982 | Spencer | 342/125 |
| 4,684,955 | 8/1987 | Adams, Jr. et al. | 364/455 |

OTHER PUBLICATIONS

K. H. Iik, "On the Analysis of Satellite Tracking Data," Abstract, Jul. 1984, International Symposium of Space Techniques for Geodynamics, Sopron Hungary, pp. 59–74.

Swinerd, "An Assessment of Satellite-to-Satellite Tracking Applied to Satellite Clusters," Astrodynamics 1985; Proceedings of the Conference, Vail, Colo., Aug. 85, pp. 1001–1018, abstract only.

*Primary Examiner*—Parshotam S. Lall
*Assistant Examiner*—Thomas G. Black
*Attorney, Agent, or Firm*—John B. Sowell; Mark T. Starr; Thomas J. Scott

[57] ABSTRACT

In a two way ranging system of the type employing pseudonoise spread spectrum codes there is provided a method for correcting the navigational system of one of two moving stations in space to compensate for relative drift. The point positions of the two stations are calculated by the on-board navigation systems of the individual stations at a first and subsequently at a second position after relative movement. The range from station 1 to station 2 is calculated employing the highly accurate pseudonoise communications ranging systems. The range uncertainty of the range calculation and the trigonmetric relation of the two calculated ranges and the include angle between the line of sight of the range directions is employed to calculate a range of uncertainty parallelogram more accurate that the navigation systems. When a station's point position is indicated by its navigation system to be outside the parallelogram, the navigation system is corrected to compensate for relative drift.

6 Claims, 3 Drawing Sheets

METHOD OF CORRECTING NAVIGATION SYSTEM ERRORS CAUSED BY DRIFT

BACKGROUND OF THE INVENTION

1. Field of the Invention

This invention is related to a method of correcting relative errors in navigation systems caused by drift. More specifically, the invention relates to a self-contained drift compensation system for transmitting-receiving stations in space having duplex data links for two way communications between stations.

2. Description of the Prior Art

Two way radio frequency ranging systems are not new. Such systems have been described in Jet Propulsion Laboratory Report 32-1475 published July 1970. Ranging systems are classified in international class GO1S 3/02 and in U.S. Class 342, subclasses 112R and 451 to 458. Such ranging systems are conveniently classified or arranged by the method by coding the data being transmitted.

One class of coding systems employs pseudonoise (PN) spread sprectrum codes in the data links which permit weak spectral signals to be transmitted and decoded accurately after being received by a remote station. The use of continuous band width pseudonoise spread spectrum codes permits processing gain enhancement at the receiver and PN coding also permits highly accurate range determination between the receiver and the transmitting stations. While PN communications systems permit accurate range determination, they are not provided with accurate directional antenna structure which would permit one station in space to accurately locate the X, Y, Z, position of another station in space.

Two or more moving platforms or stations in space need to know as accurately as possible the relative position of the other station in order to properly direct their directional antenna and to also position cameras and other scientific apparatus that may be aboard the station.

The present invention has special application where the two stations communicating with each other have long periods of outage and desire to reinstate communications between each other. In such a situation it is necessary for the stations to accurately determine the position of the other in order to properly position their directional antenna and to reacquire the PN code after an outage. Each station has its own navigational system and is capable of calculating its own X, Y, Z position in space. Ordinarily, it is desirable to have the navigational systems of the individuals stations in synchronization when they are originally put into use, however, they will develop over a period of time synchronization errors due to drift. Each navigational system has its own characteristics and accuracy and thus develops its own characteristics of drift.

Modern PN ranging systems are theoretically capable of chip rates of a billion instructions per second. Using such a PN ranging system the range between stations over thousands of miles can be determined within the accuracy of one foot, thus, employing such ranging systems it is possible to synchronize one station in space from another station in space or to synchronize all stations relatively to each other. Our U.S. Pat. No. 4,357,609 issued Nov. 2, 1982 for a "Noncoherent Two Way Ranging Apparatus" sets forth the PN ranging system of the type suitable for use in the present invention.

It would be extremely desirable to provide a method of determining the location of one transmitting-receiving station relative to another station with a degree of uncertainty small enough to correct the on-board navigational system or systems of either or both station which have accumulated drift errors.

SUMMARY OF THE INVENTION

It is a principal object of the present invention to provide a method of resynchronizing or correcting the navigation systems of stations in space.

It is another principal object of the present invention to provide a method of resynchronizing the navigation systems of stations in space so as to replace antenna tracking with directional pointing.

It is another principal object of the present invention to provide a method of removing range uncertainty after a power outage or communications outage between stations, thus, enhancing reacquistion time.

It is a general object of the present invention to provide a method of accurately determining the relative position of stations in space.

It is another general object of the present invention to accurately locate a station in space to enable the pointing or directing of scientific apparatus with enhanced accuracy.

It is another general object of the present invention to provide a method of locating stations in space relative to each other without regard to initial displacements of the stations and initial displacements of the navigation systems.

It is yet another object of the present invention to provide a method of accurately determining the position of a station in space after the space station has been moved from a previous orbit into a new orbit for purposes of defense.

According to these and other objects of the present invention there is provided a method of correcting for the relative drift that occurs between the navigational systems of moving stations in space.

Basically the system comprises the steps of calculating the X, Y, Z positions of a reference station S1 in space and then calculating a new X, Y, Z position of the same station S1 in space after the station has moved to a new location. Then the X,Y,Z position of a second station S2 in space is calculated and the range between the two stations is calculated within a range of uncertainty plur or minus d. Employing the position information and the range of uncertainty information an uncertainty parallelogram may be created within which the second station S2 in space must be located. When this new location is more accurate than the navigational system of the second station S2, then the second station's navigational system may be corrected to correct the for the relative drift that occurs in the navigational systems between the two moving stations.

DESCRIPTION OF THE PREFERRED EMBODIMENT

Figure 1:
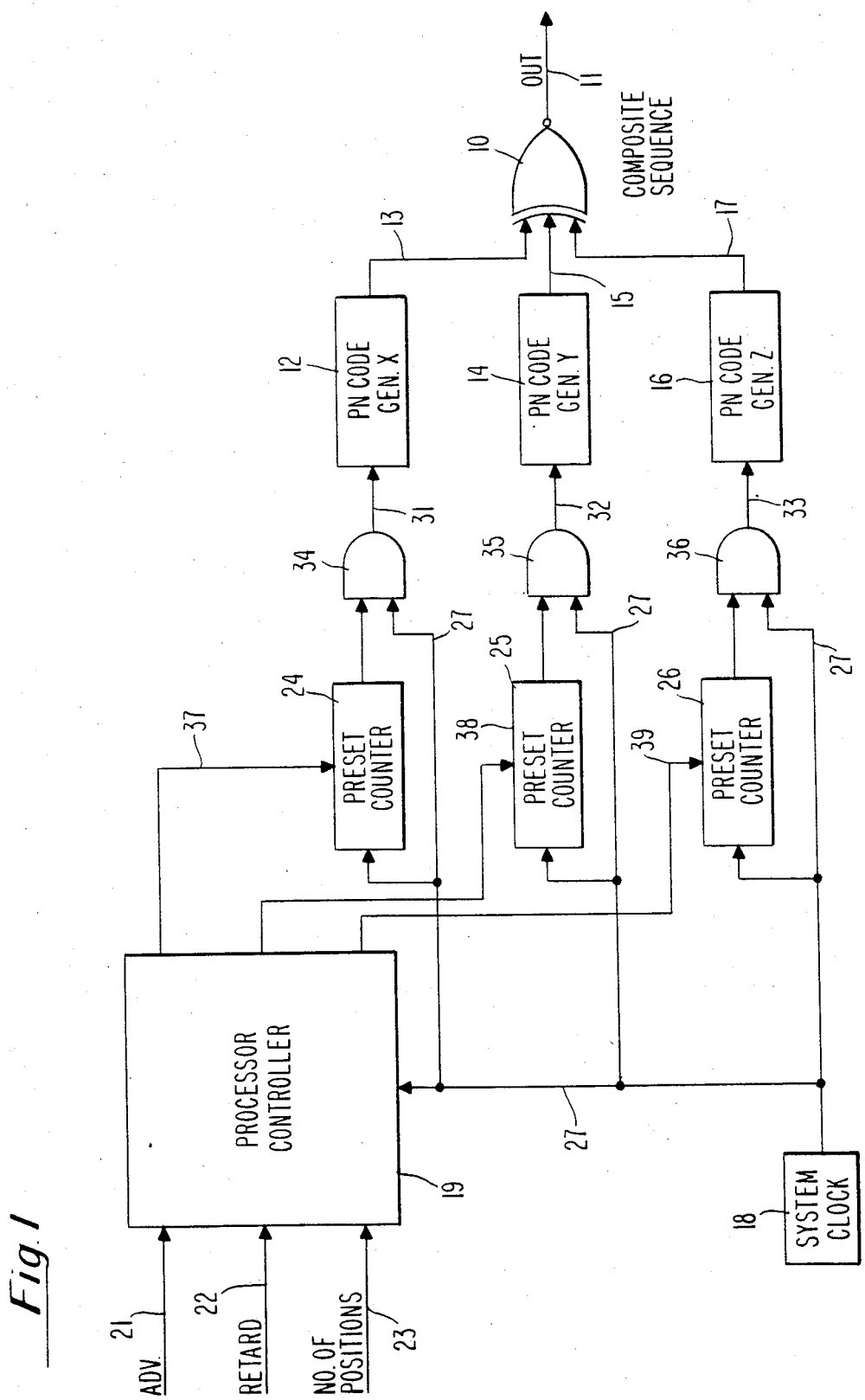
FIG. 1 is a schematic block diagram of two prior art stations in space showing part of the structure which is present in the stations.

Refer now to FIG. 1 showing schematic block diagrams of two space stations of the type which are employed to perform the present method. Station S1 is indicated at numeral 10. Station 10 comprises a computer 11, a navigation system 12, a range measuring system 13 and a data link 14 connected to the range system 13 and the computer 11. The data link is provided with a receiving and transmitting directional antenna 15. Such stations and equipment are well known in the prior art. Station S2 is indicated at numeral 16 and also comprises a navigational system 17, a range measuring system 18 and a data link 19 connected to the computer 20. The data link 19 is connected to the receiving and transmitting directional antenna 21. Such receiving and transmitting systems may be of the type which are preferably maintained continuously on or may be operated intermittently. When the stations S1 and S2 employ pseudonoises spread sprectrum coding systems, and are not continuously operated, it is necessary for the stations to reacquire the transmitted signal of the other station. When a pseudonoise spread sprectrum code is not employed the reacquisition of the signal from one station to the other is much simpler. In the preferred embodiment of the present invention a pseudonoise spread sprectrum code is employed for producing a highly accurate range determination with the communication system.

Figure 2:
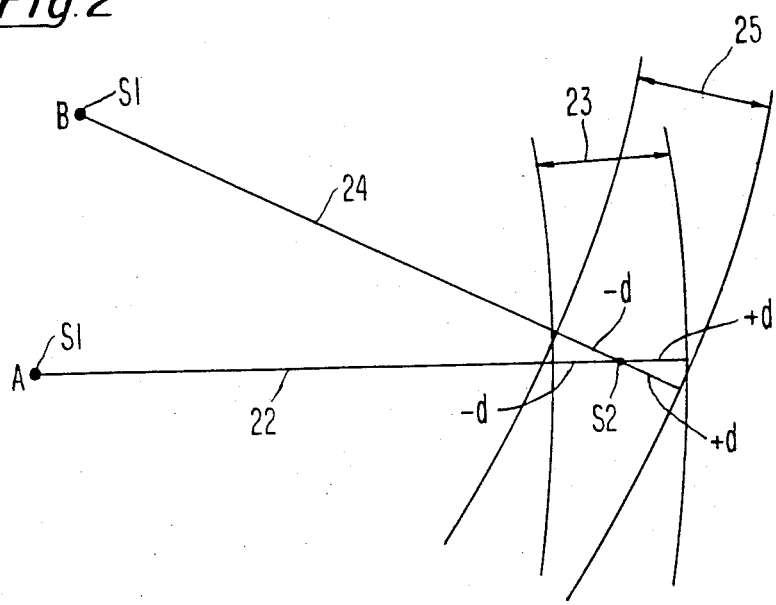
FIG. 2 is a schematic representation of the range of uncertainty d from two different measurements from station S1 to station S2.

Refer now to FIG. 2 showing Station S2 in two different positions. When Station S1 is in the A position, a range determination is made to the Station S2 which is indicated by line 22. The range of uncertainty for the range determination is indicated at plus or minus d. Thus the circular arc from focal point A to the minus d range of uncertainty and the circular arc to the outer limit of the plus d range of uncertainty form a band of error or uncertainty shown as numeral 23. Similarly when a range is taken from Station S1 at the position B to the Station S2 the range of uncertainty is also shown as plus or minus d. The range from point B is shown as numeral 24 and the band of uncertainty 25 is shown having the same width as the band uncertainty 23. It will be understood that even though the ranges 22 and 24 are shown as straight lines from Station S1 to S2 that the nature of the communication systems do not provide the true X,Y,Z direction from the station S1 to S2 with the same degree of accuracy as is provided by range determination. For example, employing a directional antenna with a one degree cone, which is highly accurate, at a distance of one thousand miles the cone has an arc 35 miles across. Thus, a directional antenna can not be employed for locating Station S2 within any degree of accuracy.

Figure 3:
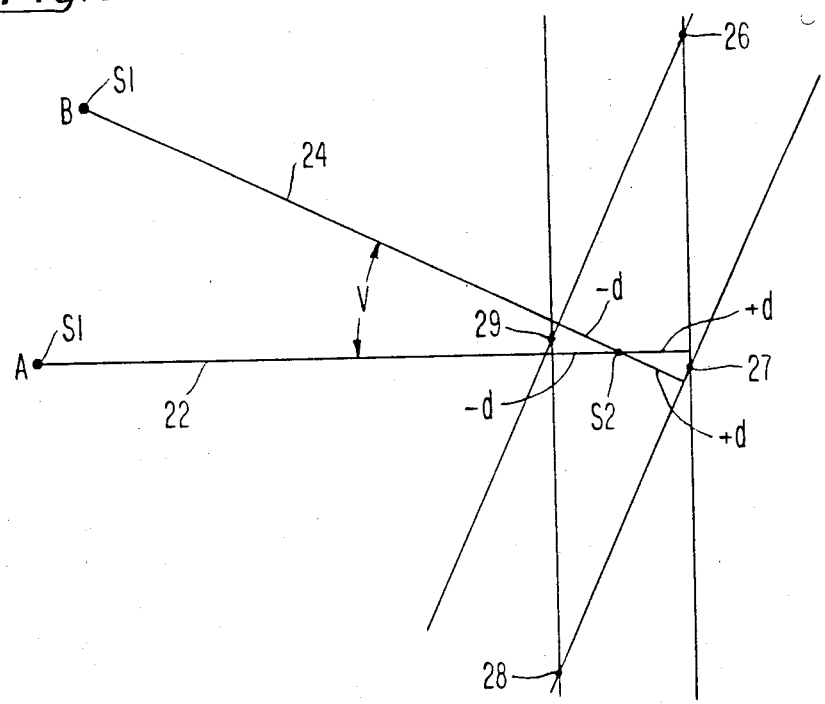
FIG. 3 is a schematic representation of the range measurements shown in FIG. 2 modified to show parallel lines which define the range of uncertainty d.

Refer now to FIG. 3 showing in schematic representation the range measurements of FIG. 2 modified so that the bands of uncertainty 23 and 25 are now shown as parallel lines. At a distance of a thousand miles the curved lines shown in FIG. 2 are substantially parallel and are straight within the area of uncertainty with which we are dealing. The range lines 22 and 24 form an included angle V and the intersections of the bands of uncertainty 23, 25 form a parallelogram of uncertainty shown as 26, 27, 28 and 29 which form the vertices of the parallelogram. For purposes of a simplified explanation we will assume that the position of Station S2 did not move when Station S1 moved from point A to point B. Each of the stations S1 and S2 have navigational systems which permit them to calculate or determine their X, Y, and Z positions in space with a relatively high degree of accuracy. Using the X,Y,Z points in space, the angle V can be determined with a high degree accuracy without depending on the directional antenna, which is inaccurate. In the preferred embodiment method employed in the present invention station S2 does move during the period station S1 moves from point A to point B. In order to compensate for the movement of S2, the relative movement of station S2 is added to the movement of the station S1 at point B so that the method can be simplified but yet maintain its accuracy. For example, S2 takes his navigational position at the same time that station S1 takes its navigational position at point A and point B. The relative movement of the station S2 may be calculated at station S2 and transmitted to station S1 over the data link 19 to the data link 14. Station S1 can use this information to compute its new B position for purposes of the present invention method. Thus, even though station S2 does not stay in one position during the acquisition of data for the method calculation to be explained hereinafter it may be assumed to be held in one position by modifying the position of station S1.

Figure 4:
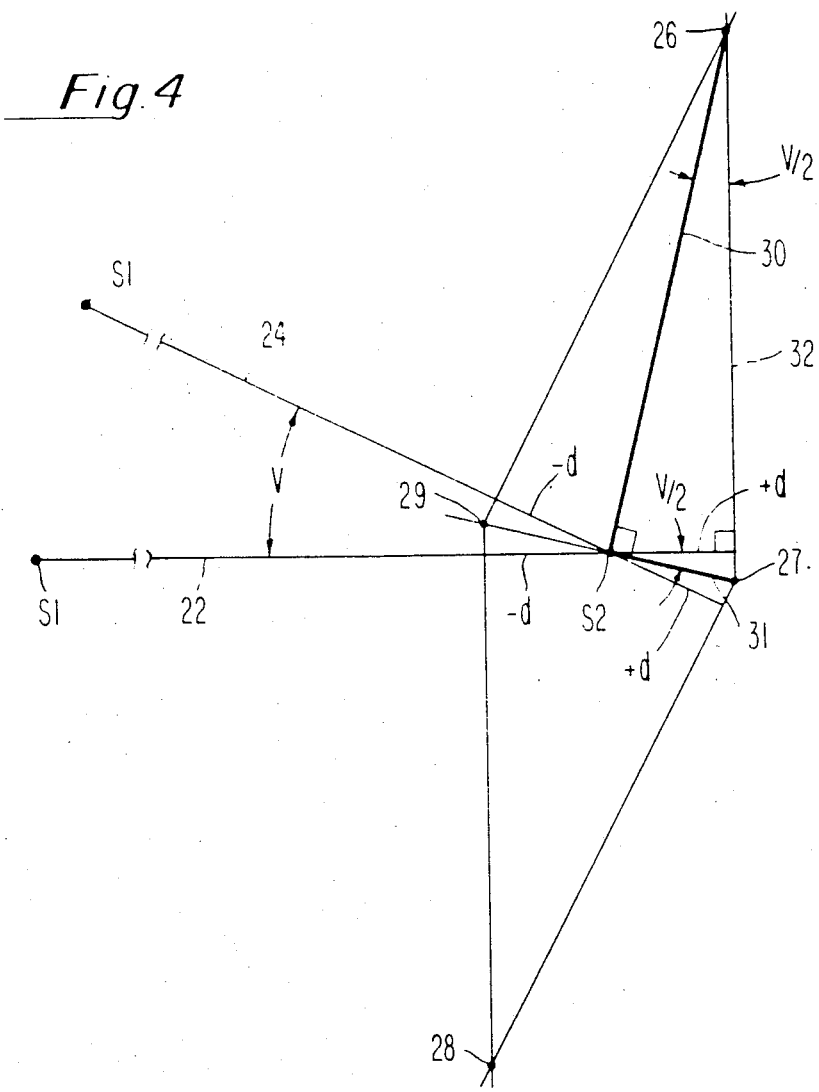
FIG. 4 is an enlarged schematic block diagram of the parallel lines shown in FIG. 3 which form the parallelogram of uncertainty.

Refer now to FIG. 4 showing in an enlarged block diagram the parallel lines shown in FIG. 3 which form the parallalogram of uncertainty 26 to 29. Within the parallelogram of uncertainty is a right triangle having sides 30, 31 and 32. Since the axis of side 31 bisects the angle V, and is part of a right triangle, side 31 is equal to $d/\cos(V/2)$ where d is the range of uncertainty and V is the included angle between the lines 22 and 24. Similarly the side 30 is shown to be $d/\sin(V/2)$. As the included V becomes large it causes the sides of the parallelogram of uncertainty to become equilateral. When the included angle V is 90 degrees the parallelogram of uncertainty is a square and each side has a dimension two times d. The accuracy of the location of station S2 relative to station S1 may be determined by the accuracy of the ranging system employed in the moving stations. In the preferred embodiments of the present invention the calculations are made at points A and B within a relative short period of time so that the drift in the navigational systems is negligibe as far as the method of location determination is concerned. It should be apparent to those skilled in this art that if station 2 had not moved, the two range determinations made from station S1 at points A and B could be employed to create intersecting radial lines as shown in FIG. 2 and the position of station S2 from station S1 could be calculated. However, since station S2 is moving at the same time station S1 is moving, it is necessary for station S2 to transmit its change of position or at least transmit the two X, Y, Z positions at the same time station S1 is calculating its X, Y, Z positions to enable station S1 to incorporate the relative movement of station S1 into its position B at station S1. Thus, it will be understood that it is necessary to have a data link to make the accurate determination that is employed in the present method.

Before departing from FIG. 4 we may summarize the present method. At point A station S1 calculates its X, Y, Z position in space using its navigational system. At the same time station S2 calculates its X, Y, Z position with its own navigational system. When station S1 moves to point B it again calculates its X, Y, Z position and at the same time station S2 calculates its X, Y, Z position. It is possible for station S2 to determine its relative X, Y, Z position movement and only transmit the relative movement back to station S1. However, station S2 may transmit its X, Y, Z positions to station S1 and station S1 makes the necessary calculation. Station S1 makes the FIG. 4 calculations determining the range of uncertainty parallelogram hereinbefore defined as parallelogram 26, 27, 28, 29 around Station S2. If the actual position of S2 does not fall within the parallelogram of uncertainty then it may be assured that the navigational system of either/or station S1 or S2 has accumulated a drift error without knowing in which navigational system the drift error has actual occurred. If station S1 is used as the reference station then the navigational system of station S2 will be corrected.

While it may be thought that the parallelogram of uncertainty is constantly changing in time and the error would have to be calculated instanteously in order to enable station 2 to correct its navigational system, this is not the case. Once it is determined that the navigational system of station S2 falls outside of the parallelogram of uncertainty, the relative error between the position being provided by the navigational system of station S2 and the true position calculated by the aforementioned ranging technique is a relative position of error calculation. The relative error may be employed to correct the navigational system of station S2.

Figure 5:
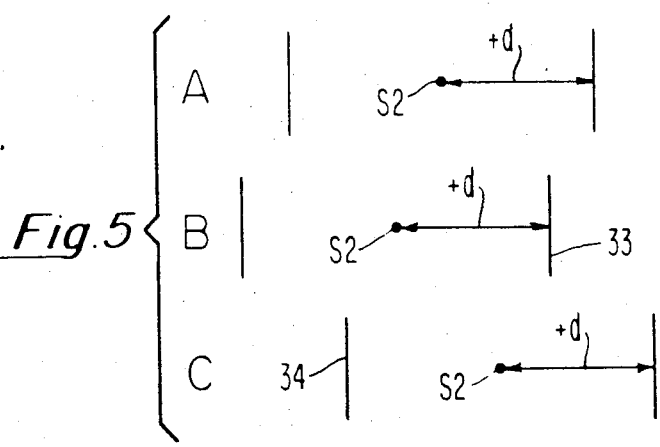
FIGS. 5A to FIG. 5C are diagramatic representations showing a plurality of range calculations that differ only slightly but may be averaged to enhance the range of uncertainty.

Refer now to FIG. 5A through 5C showing diagrammatically a plurality of range calculations that differ only slightly. In each of the FIGS. the position of S2 is shown with its deviation plus d also shown on the FIG. If the calculations are made over a short period of time so as to eliminate draft errors in the navigational systems in the two stations, then an average range may be calculated or a modified range may be calculated in which the position of station S2 will be found. For example, the position of S2 is inside the minimum range 34 and is also inside of the maximum range 33. The distance between the ranges 34 and 33 is only slightly greater than the range of the uncertainty d, thus, a modified range of uncertainty d may be calculated so as to decrease the size of the parallelogram of uncertainty. This is to say that if you can enhance the range measurement by averaging you can also enchance the parallelogram of uncertainty and the accuracy of the position of the station S2.

Having explained a preferred embodiment of the present invention it will be understood that space stations having the standard array of hardware and a communication data link, preferably a pseudonoise (PN) data link are capable of accurately determining the position of one station relative to the other even though they do not have on board apparatus which is capable of accurate directional determination. The present invention could be employed where ranging stations have radar gear which could locate the station S2 relative to station S1. Such radar ranging systems are not capable of determining distance with the accuracy employed in the present method with data links having PN ranging systems.

The preferred embodiment of the present invention has been explained empoloying station S1 as the master station which performs all of the necessary calculations for correcting the position of station S2. However, it will be understood that any part of the calculations explained hereinbefore may be performed at station S2 because S1 and S2 are tied together interchangeably by their data links. Thus, when the relative error of station S2 is determined it is not necessary that the correction be made at station S2. The relative error may be made at station S1 to its navigational system. When a plurality of stations are having their navigational systems synchronized or updated it is preferred that one station and one station only be employed as the master to synchronized other stations to increase the accuracy of correction.

What we claim is:

1. A method of correcting for relative drift that occurs in the synchronized navigational systems of two moving stations S1 and S2 in space, comprising the steps of:

calculating the X, Y, Z point positions of said stations S1 and S2 in space by employing their own navigational systems;

calculating new X, Y, Z point positions of said stations S1 and S2 in space after station S1 has moved and before the relative synchronization of the navigational systems have had time to change due to drift, calculating a range from station S1 to station S2 within range of the uncertainty defined as plus or minus d, calculating an included angle V between the point positions of the original position of the station S1, the new position of station S1 and the position of S2, calculating a range of uncertainty parallelogram around the station S2 point position wherein the major and minor axes of the parallelogram are equal to plus or minus $d/\sin(V/2)$ and plus or minus $d/\cos(V/2)$ respectively, and correcting the synchronized X, Y, Z position of station S2 when the point position of station S2 falls outside the range of uncertainty parallelogram.

2. A method of correcting for relative drift as set forth in claim 1 which further includes the step of:

calculating the relative X, Y, Z point position movement of station S2 when calculating the old and the new X, Y, Z point position of station S1, and calculating a revised new X, Y, Z point position of station S1 which compensates for the movement of station S2 relative to S1.

3. A method of correcting for relative drift as set forth in claim 1 which further includes the steps of repeating the calculations for the range of uncertainty parallelogram around station S2 over a short period of time during which the relative synchronization of the navigational systems of the stations S1 and S2 are substantially drift free, and calculating a new average range of uncertainty d, and calculating the range of uncertainty parallelogram around the station S2 employing said new average range of uncertainty d.

4. A method of correcting for relative drift as set forth in claim 1 wherein the range from station S2 to station S1 is calculated employing a pseudonoise ranging system.

5. A method of correcting for relative drift as set forth in claim 1 wherein the range from station S1 to station S2 is calculated employing radar ranging.

6. A method of correcting for relative drift as set forth in claim 1 wherein each time the position of station S1 is calculated, the point position of station S2 is calculated and the point position information calculated at station S2 is transmitted to station S1 to enable the station S1 to calculate the range of uncertainty parallelogram.

* * * * *